US012488259B2

(12) United States Patent
Hart et al.

(10) Patent No.: US 12,488,259 B2
(45) Date of Patent: Dec. 2, 2025

(54) SYSTEM FOR PROVIDING SOFTWARE RELATED ANSWER BASED ON A TRAINED MODEL

(71) Applicant: Continuity AI, LLC, Boulder, CO (US)

(72) Inventors: Joel Hart, Evergreen, CO (US); Douglas Lee Saferite, Lake City, FL (US)

(73) Assignee: Continuity AI, LLC, Boulder, CO (US)

( * ) Notice: Subject to any disclaimer, the term of this patent is extended or adjusted under 35 U.S.C. 154(b) by 0 days.

(21) Appl. No.: 18/437,155

(22) Filed: Feb. 8, 2024

(65) Prior Publication Data
US 2024/0265281 A1   Aug. 8, 2024

Related U.S. Application Data

(60) Provisional application No. 63/483,905, filed on Feb. 8, 2023.

(51) Int. Cl.
G06F 40/44 (2020.01)
G06F 40/58 (2020.01)
G06N 5/04 (2023.01)

(52) U.S. Cl.
CPC ............ *G06N 5/04* (2013.01); *G06F 40/44* (2020.01); *G06F 40/58* (2020.01)

(58) Field of Classification Search
CPC ............ G06N 5/04; G06F 40/44; G06F 40/58
USPC .......................................................... 704/9
See application file for complete search history.

(56) References Cited

U.S. PATENT DOCUMENTS

| 6,212,532 | B1 | 4/2001 | Johnson et al. |
| 6,553,385 | B2 | 4/2003 | Johnson et al. |
| 7,774,751 | B2 | 8/2010 | Zhuk |
| 7,802,231 | B2 | 9/2010 | Baisley et al. |

(Continued)

FOREIGN PATENT DOCUMENTS

| WO | 2020051272 A1 | 3/2020 |
| WO | 2021144750 A1 | 7/2021 |
| WO | 2022115030 A1 | 6/2022 |

OTHER PUBLICATIONS

International Search Report and Written Opinion for Application No. PCT/US2024/015066 dated Jun. 13, 2024 (11 pages).

(Continued)

*Primary Examiner* — Thierry L Pham
(74) *Attorney, Agent, or Firm* — Berg Hill Greenleaf Ruscitti LLP

(57) ABSTRACT

A system and associated computer-implemented methods for providing natural language understanding. One computer-implemented method provides natural language understanding of a development process. The method is executed by an electronic processor and includes receiving, from a user interface, a natural language query regarding a code base, processing the natural language query through a custom enhancement model to determine an intent of the natural language query and provide an enhanced query, and processing the enhanced query through a trained model to determine a natural language response for the natural language query, the trained model trained with generic inputs and specific inputs. The method also includes providing, through the user-interface, access to the natural language response.

21 Claims, 6 Drawing Sheets

(56) References Cited

U.S. PATENT DOCUMENTS

| | | |
|---|---|---|
| 8,015,051 B2 | 9/2011 | Chen et al. |
| 8,056,051 B2 | 11/2011 | Gerken et al. |
| 8,364,469 B2 | 1/2013 | Neale |
| 8,468,177 B2 | 6/2013 | Reeves et al. |
| 8,689,175 B2 | 4/2014 | Matsumoto |
| 9,324,025 B2 | 4/2016 | Byron et al. |
| 9,519,872 B2 | 12/2016 | Griggs |
| 9,727,589 B2 | 8/2017 | Hartley et al. |
| 9,940,361 B2 | 4/2018 | Lee et al. |
| 9,990,183 B2 | 6/2018 | Chandra et al. |
| 10,169,337 B2 | 1/2019 | Bird et al. |
| 10,380,533 B2 | 8/2019 | Byron et al. |
| 10,453,019 B1 | 10/2019 | Mcmahon et al. |
| 11,100,297 B2 | 8/2021 | Dechu et al. |
| 11,501,087 B2 | 11/2022 | Byron et al. |
| 11,521,252 B2 | 12/2022 | Lerman et al. |
| 11,537,552 B2 | 12/2022 | Grasselt et al. |
| 11,861,263 B1 * | 1/2024 | Hunt .................... G06F 3/0481 |
| 2004/0210445 A1 | 10/2004 | Veronese et al. |
| 2004/0249832 A1 | 12/2004 | Goldthorpe |
| 2008/0097748 A1 | 4/2008 | Haley et al. |
| 2010/0031232 A1 | 2/2010 | Glazier et al. |
| 2010/0031240 A1 | 2/2010 | Drumm et al. |
| 2010/0070517 A1 | 3/2010 | Ghosh et al. |
| 2013/0262501 A1 | 10/2013 | Kuchmann-beauger et al. |
| 2013/0325770 A1 | 12/2013 | Heidasch |
| 2014/0143750 A1 | 5/2014 | Gangadharan |
| 2015/0074045 A1 | 3/2015 | Belfils et al. |
| 2020/0004890 A1 | 1/2020 | Myhre et al. |
| 2021/0089587 A1 | 3/2021 | Gupta et al. |
| 2022/0107828 A1 * | 4/2022 | Mostafa .................... G06F 8/73 |
| 2022/0269706 A1 * | 8/2022 | Balasubramanian ........................ G06F 16/335 |
| 2022/0358908 A1 | 11/2022 | Gandhe et al. |
| 2022/0405314 A1 | 12/2022 | Du et al. |
| 2023/0031521 A1 | 2/2023 | Anders et al. |
| 2023/0336438 A1 * | 10/2023 | Wernick ................ G06F 16/243 |

OTHER PUBLICATIONS

Common definition or explanation for a large language model (LLM) entitled "What is a large language model (LLM)?" at https://www.cloudflare.com/learning/ai/what-is-large-language-model/.

* cited by examiner

SYSTEM FOR PROVIDING SOFTWARE RELATED ANSWER BASED ON A TRAINED MODEL

RELATED APPLICATIONS

This application claims priority to U.S. Provisional Patent Application No. 63/483,905, filed Feb. 8, 2023, the entire content of which is incorporated herein by reference.

SUMMARY

Embodiments of the present disclosure are generally directed to a system providing natural language understanding of a development process. This system, as described herein, and its components and subsystems, may be referred to herein as "Continuity AI". Also, although embodiments and examples described herein may reference a software development process associated with a code base, embodiments and examples described herein can be applied to one or more development processes associated with one or more code bases. Similarly, although embodiments and examples described herein may reference a development process, the embodiments and examples are equally applicable to one or more workflows, projects, organizational (customer) initiatives, teams, and the like. Accordingly, as used herein, a "development process" may be include one or more processes that may be associated with one or more projects, workflows, initiatives, or teams of a customer. Similarly, it should be understood that functionality described here as being provided by a model may be distributed among multiple models, wherein functionality described herein may be implemented via a stack of models or tools. Also, a model used the system described herein, such as, for example, a translation model, may be customized for a particular customer (e.g., an entity or organization) or may be a general model used across multiple customers. In addition, any databases or other data storage mechanisms described herein may be implemented as one or more databases or other data storage mechanisms.

Accordingly, in one example, disclosed herein are methods and systems for providing natural language understanding of a development process. These methods are executed by one or more electronic processors and include: receiving, from a user interface, a natural language query regarding a project and or organization, its documentation, communications, implementation, and a code base; processing the natural language query through a custom enhancement model to determine an intent of the natural language query and provide an enhanced query; processing the enhanced query through a trained model to determine a natural language response for the natural language query, the trained model trained with generic inputs and specific inputs for the datum; and providing, through the user-interface, access to the natural language response.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more embodiments of the present disclosure are set forth in the accompanying drawings and the description below. Other features and advantages of the present disclosure will be apparent from the description and drawings, and from the claims.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
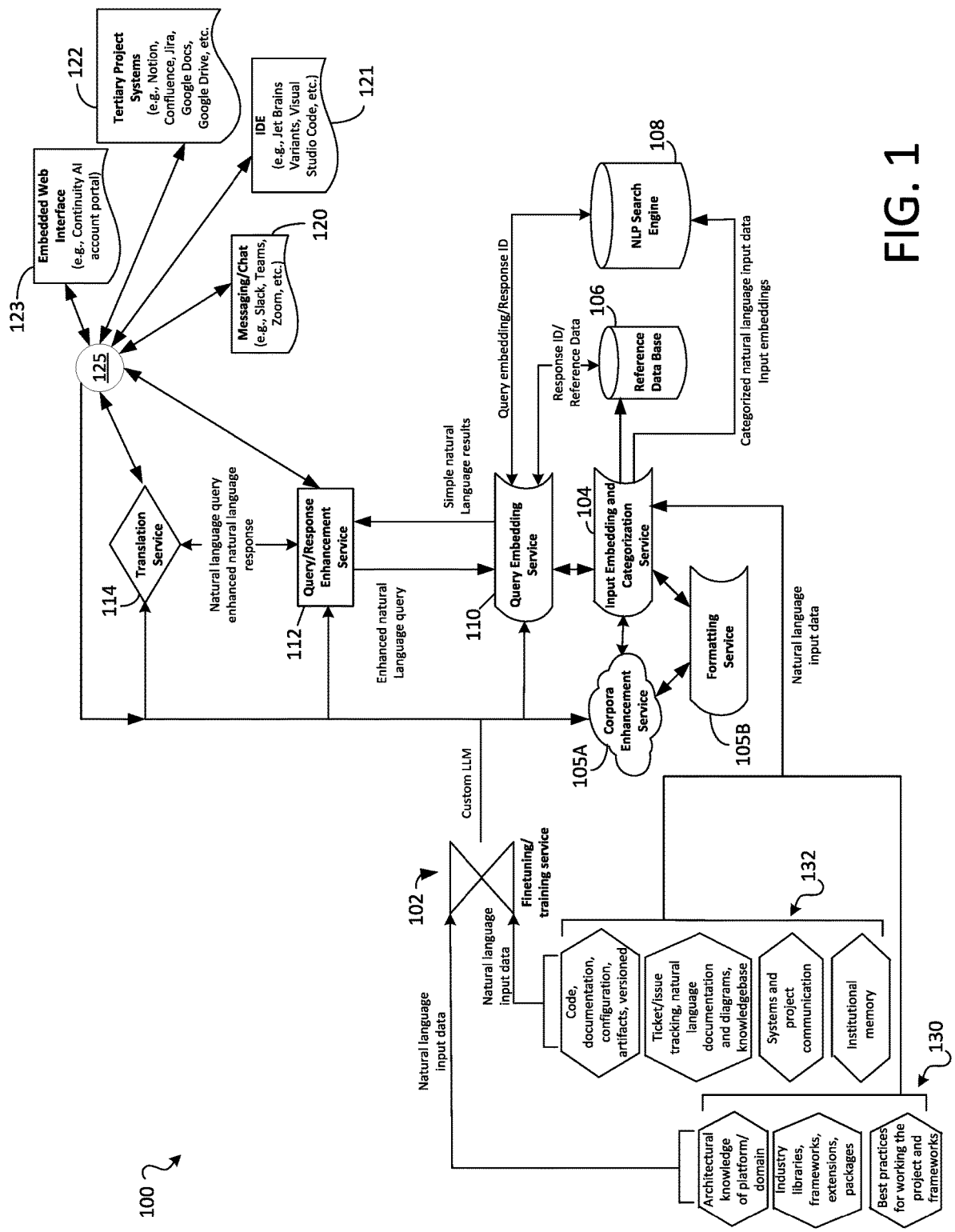
FIG. 1 depicts a non-limiting exemplary architecture of the described system.

Described herein, in certain embodiments, are systems and methods for providing natural language understanding of a development processes. An example method includes receiving, from a user interface, a natural language query regarding a project, its documentation, communications, implementation, and a code base; processing the natural language query through a custom enhancement model to determine an intent of the natural language query and provide an enhanced query; processing the enhanced query through a trained model to determine a natural language response for the natural language query, the trained model trained with generic inputs and specific inputs for the datum; and providing, through the user-interface, access to the natural language response.

Certain Definitions

Unless otherwise defined, all technical terms used herein have the same meaning as commonly understood by one of ordinary skill in the art to which the present subject matter belongs. As used in this specification and the appended claims, the singular forms "a," "an," and "the" include plural references unless the context clearly dictates otherwise. Any reference to "or" herein is intended to encompass "and/or" unless otherwise stated.

As used herein, the term "real-time" refers to transmitting or processing data without intentional delay given the processing limitations of a system, the time required to accurately obtain data and images, and the rate of change of the data and images. In some examples, "real-time" is used to describe the presentation of information obtained from components of embodiments of the present disclosure.

System Overview

Embodiments of the present disclosure are generally directed to systems, platforms, and methods for providing natural language understanding of a development processes.

More particularly, embodiments of the present disclosure are directed to a system for providing natural language understanding of a development process to the user by way of the connectors and clients providing interaction to the system based on factual data that is private and not accessible to generic large language models (e.g., ChatGPT or similar models). In some embodiments, the system provides assistance to new and junior employees of how complex systems within the organization work without the need for a senior employee, especially in circumstances where a senior employee is temporarily or permanently unavailable for whatever reason (e.g., switched teams, out on leave, left company, etc.).

For example, quality assurance (QA) is often shuffled between projects that are being developed on different timelines. One role of QA is to test features, report defects, and ultimately sign off on the release to the public, all within the project timeline. Due to the multiple project assignments, QA is frequently context shifting and needing to spend time re-learning details which leads to inefficiencies and errors. A public launch that is delayed or contains certain defects could directly negatively impact a company's bottom line. QA relies on project requirements, test plans and communication in order to be successful. When a QA member is shifting between projects, they often need to spend hours learning the details of the project by reading documentation or reaching out directly to other team members. Inefficiency is encountered when searching for the relevant documentation and is amplified when communicating directly with other team members because it also takes the other team members away from their current task at hand. This is compounded by the fact that often team members may be located around the globe. Thus, project documentation and communication may not be in their native language and communication with other team members may be limited to certain times of the day which only multiplies the inefficiency. Inefficiency, documentation and communication in a non-native language may lead to errors due to rushing to hit the timeline and at times not fully understanding the requirements because of language barriers. Accordingly, the system described herein addresses these and other issues.

In some embodiment, users interact with the system in a natural language query/response format from within the software being used by the client or the existing chat application that the team uses for internal conversation. In some embodiments, the system provides a response with knowledge of how and why the software works the way it does even when the persons that built the software may not be available. In some embodiments, the responses include context and platform aware translation so that team members from all supported backgrounds and native languages can converse in their chosen language.

Model Training Data

Training data corpus can be broken into two groups: Generic inputs and specific inputs. Generally, generic inputs include data that is common to the entire industry and specific domain knowledge about the platform being trained on while specific inputs include data that is specific to one client or one client's project that do not apply to any other client (e.g., private data, shorthand descriptions, intellectual property, or internal conventions for naming general concepts).

Generic inputs may include, for example, architectural knowledge of how a technical platform works, documentation of the platform itself including API definitions of the platform under question, documentation and description of libraries, frameworks and extensions commonly used to extend the functionality of the platform, and description of best practices for solving complex architectural requirements on the platform (e.g., performance improvement tactics, security vulnerability mitigation, reliability architectural decisions, discoverability of new code being written, software error resilience, and the like).

Specific inputs may include client software such as client code, client code documentation, client code configurations, client database structures, client code configurations, client code repository information, client API definitions, client code metadata, client build instructions for software, client conversation steams, project management system contents, information from business systems at an organization level and the like.

Multi-modal data used to support the development of client code may include tickets used to track features and bugs, history of tickets used to track features and bugs, natural language documentation and diagrams of features and bugs, relationships between software modules created by the client, feature requests from within the client's organization to describe the code, runtime, and compile time or runtime error messages, and the like.

Multi-modal project communication data includes client emails describing the solution developed from team members, communications describing the architecture of client code, chat history on client communication channels, recorded and transcribed videos describing functionality of the system, and the like.

System Input and Training

In some embodiments, the fine-tuned model is not solely central to the system. Moreover, in some embodiments, the fine-tuned model, and the reference data (which we have labelled using that model) both work in concert to provide the unique functionality of the system. In some embodiments, fine tuning a language model and then associating it with the organization's code, documentation and metadata using a process of labelling their unlabeled data means that answers to queries are drawn from that specific corpus of data with conversational, and informational memory.

In some embodiments, generic large language models (LLMs) have no permission to read the client's code or tertiary corpora to generate intelligent natural language answers to queries about it and may just confidently confabulate responses based on content written outside of the organization and available on, for example, Stack Overflow and Google®. In some embodiments, securely available context built from custom models and/or proprietary corpora with machine learning techniques provide a technological advantage over generic and hosted LLMs.

In some embodiments, the historical content of all code, documentation, and structured corpora created about the software and systems hold important information about a system and how it is built and operates. The described system labels and includes this information as valid data so responses to questions about how the system works take this context and content into account, which is incredibly useful for all knowledge workers in their workflow, particularly developers.

In some embodiments, the system is unable to answer, with confidence, the query of the end user, and having access to the project and organization corpora including code and other generic and specific inputs will help direct the end user to the correct human or information compartment.

In some embodiments, in addition to directing users around the corpora, including responsible code for a given inquiry, the model has been fine-tuned to provide conversational responses to their query to help them achieve their goal for an example to help document their code or automate other workflows, particularly for the software development team and its various roles and responsibilities.

In some embodiments, the reference data which is labeled and vectorized for natural language search are also trained on other private software packages and internal projects within the organization. In some examples, this may mean solutions to end user queries that may already be solved internally will be presented to them despite their inability to describe what they are searching for with the exact keywords that match any jargon (e.g., through model trains or configuration of an internal model or LLM) used on those modules and projects.

In some embodiments, responses use the same jargon that the organization already uses in their internal documentation and discussion of a project so the user will not be given generic terms like regular AI chatbots and search engines, like, for example, Google®.

System Output

In some embodiments, output provided by the described system includes conversational natural language responses to the end user's query at their point of interaction based specifically on the project and or organization on which they are working. In some embodiments, the output is made available in a panel that is accessible to the end user in, for example, any connectors as described below with respect to FIG. 1, like an integrated development environment (IDE) so users can seamlessly and conveniently interact with the output while working. In some embodiments, a user interface is provided that includes a panel that can be opened or closed with a space for querying the system in a natural language manner and getting responses within the interacting connector (e.g., IDEs, messaging systems, knowledge and project management systems, and any other interfaces connected to Continuity AI).

In some embodiments, a natural language response that include a reference to a file, class, module, package, or function that is currently available to the user in a repository on which they are working or have authorization for and is clickable (selectable) to instruct the IDE (or other connector to which the result is provided) to open or otherwise cause the user to navigate to that file to the appropriate line number to which the response is referring by way of one of the integrated systems and corpora. In some embodiments, responses that include references to external and internal repositories, software packages, or modules are linked directly to the internal corpora services of the company so the user can research further. In some embodiments, responses based on industry best practices and available third-party frameworks and libraries link out directly to that package for more information and when possible, provide instructions to the user for quickly integrating that framework or library into their project and working with it when asked how to type questions.

In some embodiments, a natural language response that may include explanations of institutional memory, documentation, references to internal corpora and responses sometimes including combinations of appropriate domain and or institutional memory to provide knowledge and sometimes alongside references to support the solution.

In some embodiments, when queries are sent to the system with context of an open file or section of marked (e.g., highlighted code), then the system provides a recommendation of a change to this file or highlights code to achieve the solution to the query. For example, a single click of the recommended changes replaces the working highlighted code with the recommended version from the system. In some embodiments, chat interfaces are standard and also include links directly to the internal corpora services of the company. In some embodiments, when queries are sent to the system with context of an open file or section of highlighted code, then the system provides an understanding of functionality and behavior of this file or highlighted code to help the user understand the code.

Model Training

In some embodiments, the system loads a translation service with a custom translation model for a client, which awaits requests for translation with a given "from_language" to a specified "to_language" and return the translated text to the service that requested it. In some embodiments, the system loads a translation system and a model for use across the system and not specific to a customer, sometimes taking into account domain specific jargon and handles from_language and to_language scenarios in various contexts (e.g., source corpora, input user language, mixed corpora languages, mixed platform documentation languages, etc.).

In some embodiments, the system employs a custom enhancement model for a client to enhance the query. For example, the system may determine, by way of third party models or proprietary models or algorithms the intent of the query (e.g., answer why, find solution, search for options, optimize code), enhance the query by prepending or appending custom information about it based on the context being asked, available AI models, tools, or subsystems within the Continuity AI, or custom information about the client's corpora (e.g., documentation, code intelligence, architecture, enhance the query by adding metadata filters to it so embedding services and natural language processing (NLP) search engines have a better chance at a successful match, request translation if it detects a mismatch between the source corpora's language and the actual language typed, and the like. For example, the system may determine the intent of the query, and route the query to a specifically trained model for the task inquired about. (e.g., user asks for a description of user stories to build a named new feature, and the response is generated from a subsystem that has been built specifically to automate this kind of task.

In some embodiments, the system employs a custom enhancement model to enhance the results for a client. For example, the system may enhance the results by converting the results of a match on the NLP search engine to a natural language response to the end user's query, adding context or nuance to the query or results based on the intent of the query determined upon request, suggesting further changes to the query that may provide a better match, and the like.

In some embodiments, the system employs an embedding model to convert the input data or query that is given to it into vector representation of the content that will be stored in the NLP search engine for future matching.

Model Use

In some embodiments, the translation service is loaded with a translation model that awaits requests for translation with a given from_language and a specified to_language and return the translated text to the service that requested it.

In some embodiments, the custom enhancement model for a client enhances queries by, for example, determining intent of a query (e.g., answer why, find solution, search for options, optimize code, perform an automated engineering task, provide a response including information from the project or organizations corpora), enhancing the query by prepending or appending custom information about it based on the context being asked or custom corpora about the client's architecture learned during ingestion, enhancing the query by adding metadata filters to it so embedding services and NLP search engines have a better chance at a successful match, converting the results of match on the NLP search engine to a natural language response to the end user's query, adding context to the results based on the intent of the query determined upon request, suggesting further changes to the query that may provide a better match if determined pertinent or asked to, and the like.

FIG. 1 depicts an example architecture 100 for the described system. As illustrated in FIG. 1, the architecture 100 includes a finetuning/training service 102, an input embedding and categorization service 104, a corpora enhancement service 105A, a formatting service 105B, a reference database 106, an NLP search engine 108, a query embedding service 110 (also referred to herein as a query service 110), a query/response enhancement service 112, and a translation service 114. As illustrated in FIG. 1, the query/response enhancement service 112 and the translation service 114 interact with one or more connectors 125, which as illustrated in FIG. 1 may include or interface with one or more messaging or chat applications 120 (e.g., Slack, Microsoft® Teams, and the like), an IDEs 122 (e.g., Jet Brians Variants, Visual Studio Code, etc.), tertiary project systems (e.g., Notion, Confluence, Jira, Google® Docs, Google® Drive, etc.), embedded web interfaces (e.g., Continuity AI account portal), or a combination thereof. In some embodiments, one or more of the connectors 25 may provide data for ingestion by the system (e.g., the finetuning/training service 102 and input embedding and categorization service 104) in addition to or separate from providing an interface for receiving queries and providing responses. Data provided by such connectors 125 may be used to keep the data and models maintained by the system up-to-date.

The finetuning/training service 102 fine tunes a large language model based on based on both generic inputs 130 and specific input 132. The generic inputs 130 include natural language input data, such as, for example, an architectural description or other knowledge of the platform and/or domain, descriptions of capabilities and functionalities of the various libraries, frameworks, extensions, and packages (paid or otherwise) available to the platform, descriptions of best practices for working with the platform and its frameworks, or a combination thereof. The specific inputs 132 include multi-modal and natural language input data, such as, for example, the code base, documentation of the organization and project (e.g., developer areas of work associated with a code base) (all or portion of which may be autogenerated), business corpora including organization level content and project level content, conversation history corpora ingest from communications (e.g., chat, email, or a combination thereof), communications and content piped via connectors from internal and external system, or a combination thereof. With respect to the business corpora, these inputs may include corpora sourced from project management software, knowledge base software, and other various corpora existing at a project or organization level. Based on these inputs 130 and 132, the finetuning/training service 102 generate a custom LLM for embedding, enhancement, and translation as described herein. As illustrated in FIG. 1, the custom LLM may be used be one or more components of the system to perform the described functionality.

The inputs 130 and 132 (or a portion thereof) are also provided as input to the input embedding and categorization service 104 (for encoding using a custom model and one or more LLMs (e.g., one or more embedding models that may be fine-tuned to specific technologies, industries, and/or organizations) to be stored as vectors or similar NLP representations in a search database). For example, the input embedding and categorization service 104 performs data ingestion where inputs (e.g., the inputs 130 and 132 or a portion thereof) are encoded or embedded using the trained LLM and the encodings are stored as vectors or similar NLP representations in a search database (e.g., as part of the NLP search engine 108). The embeddings are also matched to original NLP reference data and stored separately (e.g., as categorized natural language input data in the reference database 106). It should be understood that a natural language search may include or be referred to as a semantic search. However, in some embodiments, a natural language search may include a semantic search, other search techniques, or a combination thereof. Also, in some embodiments, the input embedding and categorization service 104 may perform (independently or with the corpora enhancement service 105A) pre-processing of the ingested data (e.g., the inputs 130 and 132 or a portion thereof), such as, for example, using an LLM (e.g., the custom LLM) to normalize, classify, and enhance the data prior to encoding. The ingested data (e.g., the inputs 130 and 132 or a portion thereof) can additionally be used to train or fine-tune additional models for an organization.

As illustrated in FIG. 1, the input embedding and categorization service 104 may communicate with a corpora enhancement service 105A, a formatting service 105B, or both. The corpora enhancement service 105A may be used to create (e.g., using one or more generative AI models) corpora for a customer, such as, for example, autogenerated summaries of one or more software packages and customizations, which may be specified by a user or other input or automatically determined by accessing or scanning systems and services of the customer, public data sources, or the like. The corpora enhancement service 105A and/or the input embedding and categorization service 104 may use the formatting service to put such created content into a format for processing by the input embedding and categorization service 104.

User queries may be received from a connector 125 that may represent a point of requirement by an end user, such as for example, within the chat application 120 and/or the IDE 122 or other applications or systems (e.g., knowledge base software, project management and ticketing software, etc. Thus, the end user may not need to switch applications to get an answer since answers are available in the location of the query (e.g., the IDE 122, chat application 120, or other type of connector). As described herein, translations may be determined at configuration time, and responses to queries may be provided directly at the location of the query (e.g., within the chat application 120 and/or the IDE 122).

The translation service 114 is optional and may be automated and based on the languages presented in the relevant corpora and the input language of the query and other contexts across the system. For example, as illustrated in FIG. 1, in some embodiments, queries and responses may be exchanged between the connectors 125 without being processed via the translation service 114. When used, the translation service 114 may be bi-directional for queries and responses.

The query/response enhancement service 112 receives a query (e.g., from the chat application 120 and/or the IDE 122 and/or optionally through the translation service 114) and determines the intent of the query using, for example, a third-party model configured to determine intent of natural language input, the custom trained LLM, the context of the query (which could be open code or highlighted code, a query seeking technical information and documentation, or the like), or a combination thereof. The query/response enhancement service 112 enhances the query using domain specific knowledge and the custom LLM (e.g., what sort of data structures are to be searched or what workflow automation subsystems are to be called). The query/response enhancement service 112 may also enhance the query by specifying response filers based on context (e.g., engineering task, business analyst task, software designer task, a specific platform version, etc.). The query/response enhancement service 112 sends the enhanced query to the query embedding service 110, which sends the enhanced query to the NLP search engine 108. In some embodiments, the query/response enhancement service 112 may send the enhanced query to one or more appropriate subsystems, which may include the query embedding service 110.

When matches are found via the NLP search engine 108 (e.g., as a response ID), the query embedding service 110 matches the response identifiers to labeled reference data stored in the reference database 106. The query embedding service 110 may send all matches to the query/response enhancement service 112, which may use the custom trained LLM and/or other tools and data sources (e.g., public corpora) to determine the accuracy of the results. The most accurate results (e.g., results having a confidence level satisfying a (configurable) threshold are enhanced by the query/response enhancement service 112 (using the custom trained LLM, the intent of the query previously determined by the query/response enhancement service 112, or a combination thereof). The enhanced results are optionally sent to the translation service 114 or back to the connector where the query was submitted (e.g., the chat application 120 and/or IDE 122). It should be understood that accuracy checks may be implemented in the system at various models and subsystems in addition to or separate from any accuracy checks by the service 112 (which may perform supervisory checks).

Example Processes

Figure 2:
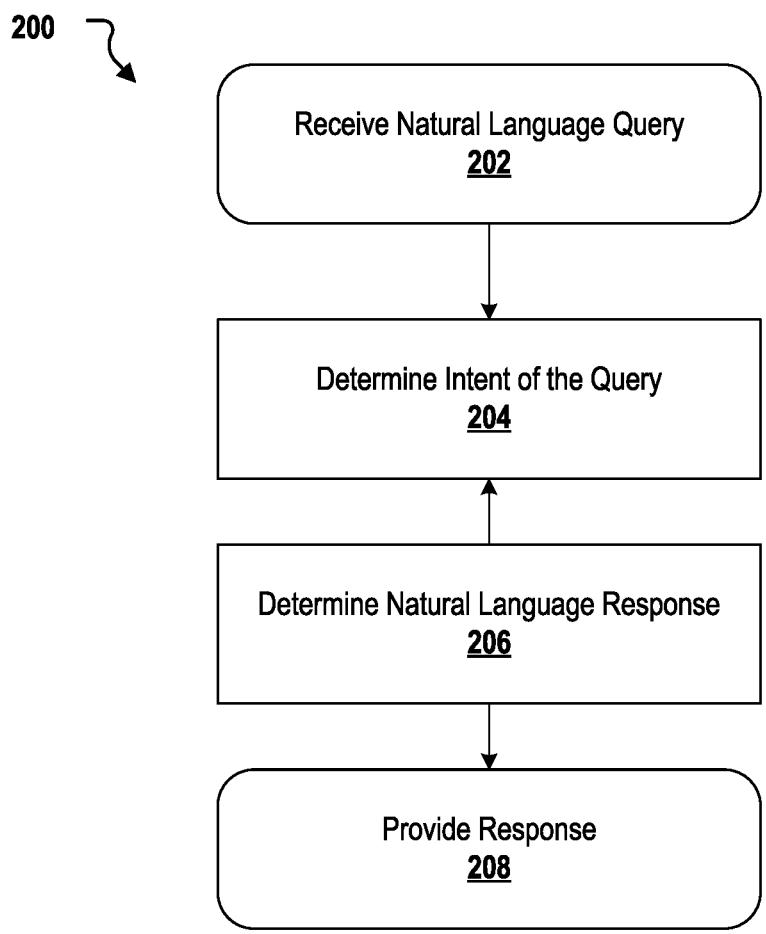
FIG. 2 depicts a flowchart of a non-limiting exemplary process that can be implemented by embodiments of the present disclosure.

FIG. 2 depicts a flowchart of an example process 200 that can be implemented by embodiments of the present disclosure. The example process 200 can be implemented by the components of the described system, such as described above in FIG. 1. The example process 200 generally shows in more detail how natural language understanding of a development process can be determined as a response to a query by processing through a trained model employed within the described system.

For clarity of presentation, the description that follows generally describes the example process 200 in the context of FIGS. 1 and 3-4C. However, it will be understood that the process 200 may be performed, for example, by any other suitable system, environment, software, and hardware, or a combination of systems, environments, software, and hardware as appropriate. In some embodiments, various operations of the process 200 can be run in parallel, in combination, in loops, or in any order.

At 202, a natural language query regarding proprietary corpora (e.g., code base, code functionality, project components, systems architecture, institutional memory, documentation, project management, communications, meetings, etc.) is received. From 202, the process 200 proceeds to 204.

At 204, the natural language query is processed through a custom enhancement model to determine an intent of the natural language query and provide an enhanced query. From 204, the process 200 proceeds to 406.

At 206, the enhanced query is processed through a trained model to determine a natural language response for the natural language query. In some embodiments, the model is trained (finetuned) with generic inputs and specific inputs for the code base. From 206, the process 200 proceeds to 208.

At 208, access to the natural language response is provided through a user-interface. From 208, the process 200 ends.

Processing Devices and Processors

In some embodiments, the platforms, systems, media, and methods described herein include a computer, or use of the same. In further embodiments, the computer includes one or more hardware central processing units (CPUs) or general purpose graphics processing units (GPGPUs) that carry out the device's functions. In still further embodiments, the computer comprises an operating system configured to perform executable instructions. In some embodiments, the computer is optionally connected a computer network. In further embodiments, the computer is optionally connected to the Internet such that it accesses the World Wide Web. In still further embodiments, the computer is optionally connected to a cloud computing infrastructure. In other embodiments, the computer is optionally connected to an intranet. In other embodiments, the computer is optionally connected to a data storage device.

In accordance with the description herein, suitable computers include, by way of non-limiting examples, server computers, desktop computers, laptop computers, notebook computers, sub-notebook computers, netbook computers, netpad computers, handheld computers, Internet appliances, mobile smartphones, tablet computers, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the computer includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®).

In some embodiments, the device includes a storage or memory device. The storage or memory device is one or more physical apparatuses used to store data or programs on a temporary or permanent basis. In some embodiments, the device is volatile memory and requires power to maintain stored information. In some embodiments, the device is non-volatile memory and retains stored information when the computer is not powered. In further embodiments, the non-volatile memory comprises flash memory. In some embodiments, the volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, compact disc read-only memory (CD-ROM), digital versatile disc (DVD), flash memory devices, magnetic disk drives, magnetic tapes drives, optical disk drives, and cloud computing based storage. In further embodiments, the storage and/or memory device is a combination of devices such as those disclosed herein.

In some embodiments, the computer includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with a computer, such as a virtual reality (VR) headset. In further embodiments, suitable VR headsets include, by way of non-limiting examples, HTC Vive, Oculus Rift, Samsung Gear VR, Microsoft HoloLens, Razer Open-Source Virtual Reality (OSVR), FOVE VR, Zeiss VR One, Avegant Glyph, Freefly VR headset, and the like. In still further embodiments, the display is a combination of devices such as those disclosed herein.

In some embodiments, the computer includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Figure 3:
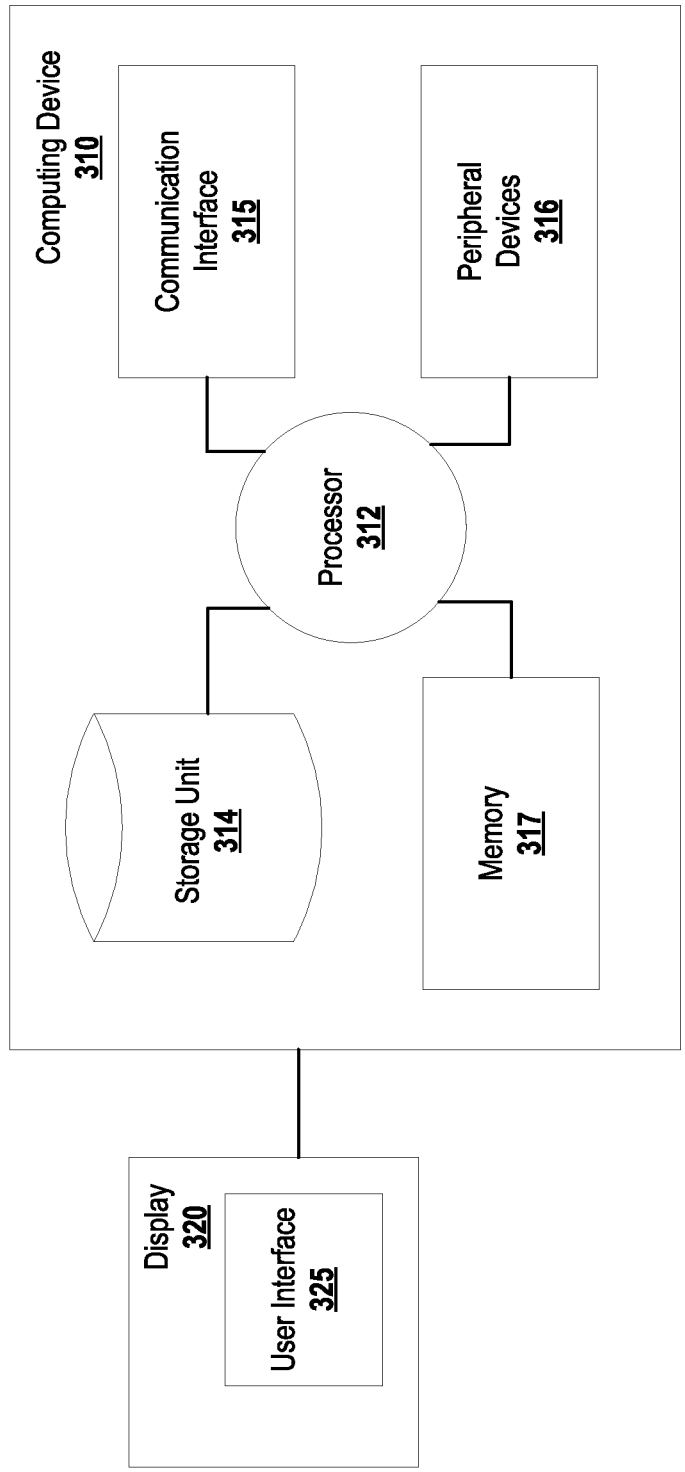
FIG. 3 depicts a non-limiting example computer system that can be programmed or otherwise configured to implement methods or systems of the present disclosure.

Computer control systems are provided herein that can be used to implement the platforms, systems, media, and methods of the disclosure. FIG. 3 depicts an example computer system 300 that can be programmed or otherwise configured to implement platforms, systems, media, and methods of the present disclosure. For example, the computing device 310 can be programmed or otherwise configured to display a user-interface or application provided by the described system.

In the depicted embodiment, the computing device 310 includes a CPU (also "processor" and "computer processor" herein) 312, which is optionally a single core, a multi core processor, or a plurality of processors for parallel processing. The computing device 310 also includes memory or memory location 317 (e.g., random-access memory, read-only memory, flash memory), electronic storage unit 314 (e.g., hard disk), communication interface 315 (e.g., a network adapter) for communicating with one or more other systems, and peripheral devices 316, such as cache, other memory, data storage, and/or electronic display adapters. In some embodiments, the memory 317, storage unit 314, communication interface 315, and peripheral devices 316 are in communication with the CPU 312 through a communication bus (solid lines), such as a motherboard. The storage unit 314 comprises a data storage unit (or data repository) for storing data. The computing device 310 is optionally operatively coupled to a computer network, such as the network 410 depicted and described in FIG. 4A, with the aid of the communication interface 315. In some embodiments, the computing device 310 is configured as a back-end server deployed within the described system.

In some embodiments, the CPU 312 can execute a sequence of machine-readable instructions, which can be embodied in a program or software. The instructions may be stored in a memory location, such as the memory 317. The instructions can be directed to the CPU 312, which can subsequently program or otherwise configure the CPU 312 to implement methods of the present disclosure.

Examples of operations performed by the CPU 312 can include fetch, decode, execute, and write back. In some embodiments, the CPU 312 is part of a circuit, such as an integrated circuit. One or more other components of the computing device 310 can be optionally included in the circuit. In some embodiments, the circuit is an application specific integrated circuit (ASIC) or a FPGA.

In some embodiments, the storage unit 314 stores files, such as drivers, libraries, and saved programs. In some embodiments, the storage unit 314 stores user data, e.g., user preferences and user programs. In some embodiments, the computing device 310 includes one or more additional data storage units that are external, such as located on a remote server that is in communication through an intranet or the Internet.

In some embodiments, the computing device 310 communicates with one or more remote computer systems through a network. For instance, the computing device 310 can communicate with a remote computer system. Examples of remote computer systems include personal computers (e.g., portable PC), slate or tablet PCs (e.g., Apple® iPad, Samsung® Galaxy Tab, etc.), smartphones (e.g., Apple® iphone, Android-enabled device, Blackberry®, etc.), or personal digital assistants. In some embodiments, a user can access the computing device 310 via a network.

In some embodiments, the platforms, systems, media, and methods as described herein are implemented by way of machine (e.g., computer processor) executable code stored on an electronic storage location of the computing device 310, such as, for example, on the memory 317 or the electronic storage unit 314. In some embodiments, the CPU 312 is configured to execute the code. In some embodiments, the machine executable or machine readable code is provided in the form of software. In some embodiments, during use, the code is executed by the CPU 312. In some embodiments, the code is retrieved from the storage unit 314 and stored on the memory 317 for ready access by the CPU 312. In some situations, the electronic storage unit 314 is precluded, and machine-executable instructions are stored on the memory 317. In some embodiments, the code is pre-compiled. In some embodiments, the code is compiled during runtime. The code can be supplied in a programming language that can be selected to enable the code to execute in a pre-compiled or as-compiled fashion.

In some embodiments, the computing device 310 can include or be in communication with an electronic display 320. In some embodiments, the electronic display 320 provides a UI 325 that depicts various screens.

Figure 4A:
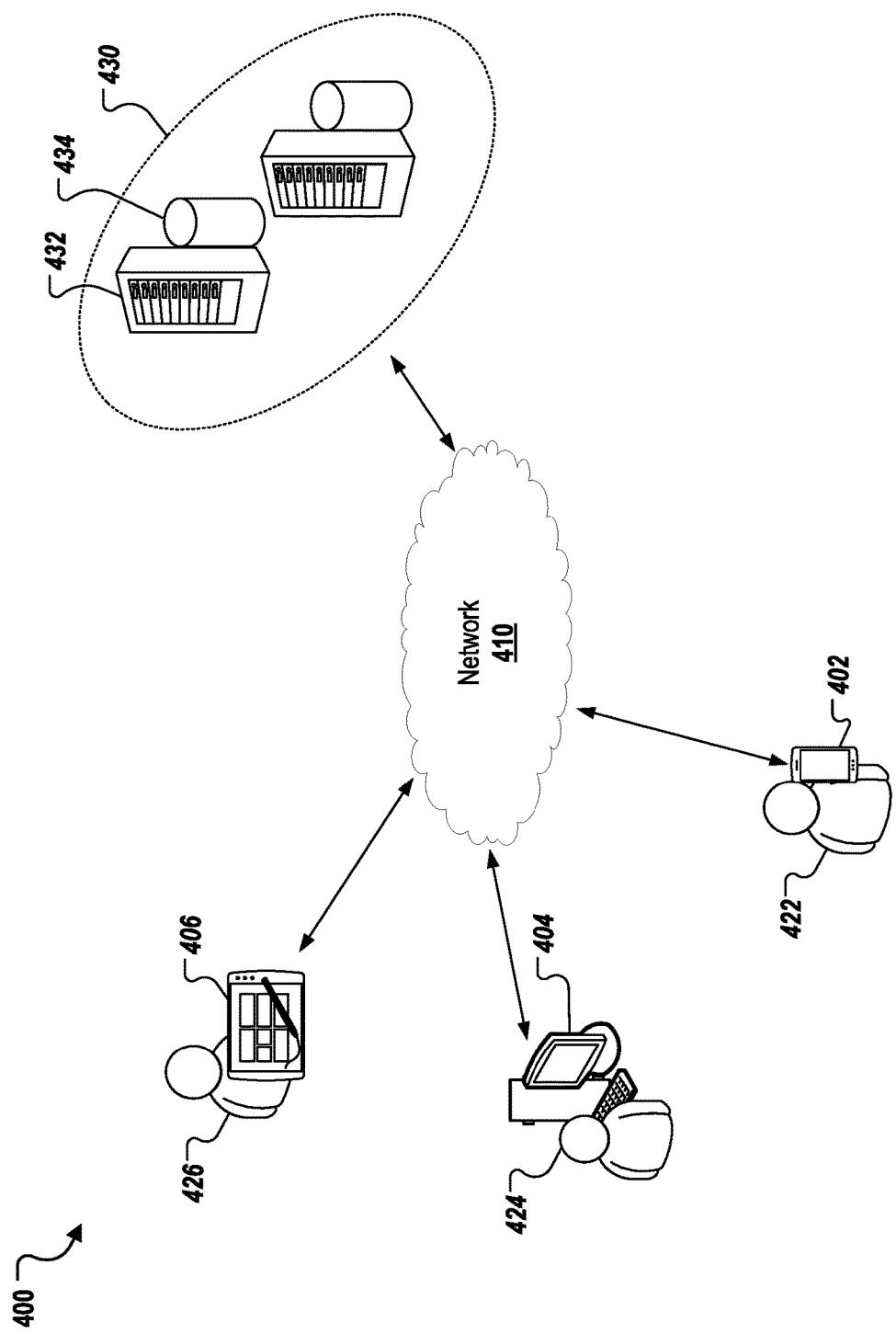
FIG. 4A depicts a non-limiting example environment that can be employed to execute embodiments of the present disclosure.

FIG. 4A depicts an example environment 400 that can be employed to execute embodiments of the present disclosure. The example environment 400 includes computing devices 402, 404, 406, a back-end system 430, and a network 410. In some embodiments, the network 410 includes a local area network (LAN), wide area network (WAN), the Internet, or a combination thereof, and connects web sites, devices (e.g., the computing devices 402, 404, and 406) and back-end systems (e.g., the back-end system 430). In some embodiments, the network 410 includes the Internet, an intranet, an extranet, or an intranet and/or extranet that is in communication with the Internet. In some embodiments, the network 410 includes a telecommunication or a data network. In some embodiments, the network 410 can be accessed over a wired or a wireless communications link. For example, mobile computing devices (e.g., the smartphone device 402 and the tablet device 406), can use a cellular network to access the network 410.

The described system may be employed within the example environment 400 to, for example, employ machine learning/AI techniques for processing contextual data through a machine-learning algorithm to provide natural language understanding of a development processes, the machine learning algorithm having been trained with received generic inputs and specific inputs for a code base.

In some examples, the users 422, 424, and 426 interact with the described system through a graphical user interface (GUI) or application that is installed and executing on their respective computing devices 402, 404, and 406. In some examples, the computing devices 402, 404, and 406 provide viewing data to screens with which the users 422, 424, and 426 can interact. In some embodiments, the computing devices 402, 404, 406 are sustainably similar to computing device 310 depicted in FIG. 3. The computing devices 402, 404, 406 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. Three user computing devices 402, 404, and 406 are depicted in FIG. 4A for simplicity. In the depicted example environment 400, the computing device 402 is depicted as a smartphone, the computing device 404 is depicted as a tablet-computing device, and the computing device 406 is depicted a desktop computing device. It is contemplated, however, that embodiments of the present disclosure can be realized with any of the appropriate computing devices, such as those mentioned previously. Moreover, embodiments of the present disclosure can employ any number of devices as required.

In the depicted example environment 400, the back-end system 430 includes at least one server device 432 and at least one data store 434. In some embodiments, the device 432 is sustainably similar to computing device 310 depicted in FIG. 3. In some embodiments, the back-end system 430 may include server-class hardware type devices. In some embodiments, the server device 432 is a server-class hardware type device. In some embodiments, the back-end system 430 includes computer systems using clustered computers and components to act as a single pool of seamless resources when accessed through the network 410. For example, such embodiments may be used in data center, cloud computing, storage area network (SAN), and network attached storage (NAS) applications. In some embodiments, the back-end system 430 is deployed using one or more virtual machines. In some embodiments, the data store 434 is a repository for persistently storing and managing collections of data. Example data stores that may be employed within the described system include data repositories, such as a database as well as simpler store types, such as files, emails, and so forth. In some embodiments, the data store 434 includes a database. In some embodiments, a database is a series of bytes or an organized collection of data that is managed by a database management system (DBMS).

In some embodiments, the at least one server system 432 hosts one or more computer-implemented services, such as described above, provided by the described system that users 422, 424, and 426 can interact with using the respective computing devices 402, 404, and 406.

Figure 4B:
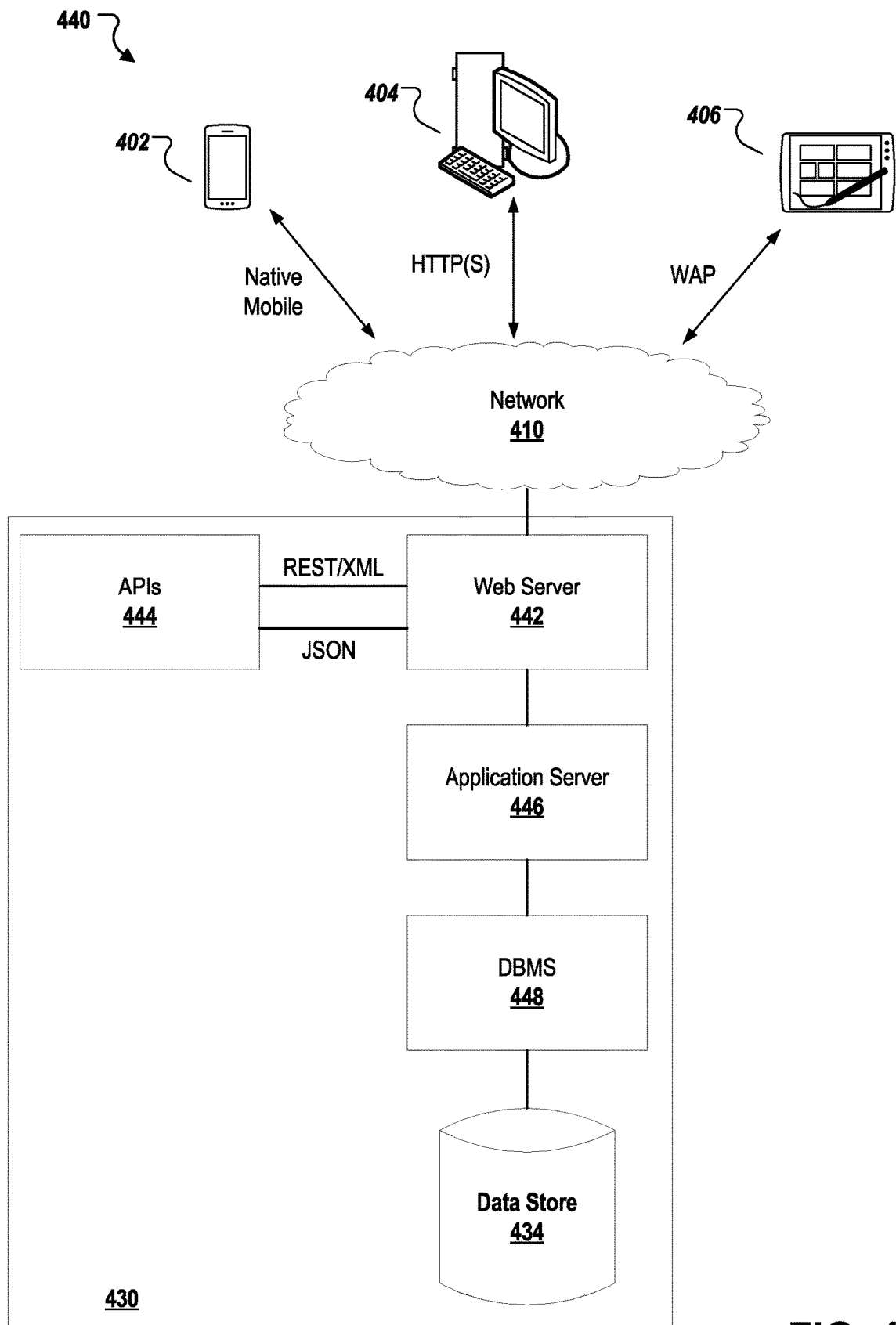
FIG. 4B depicts a non-limiting example application provision system that can be provided through an environment and employed to execute embodiments of the present disclosure.

FIG. 4B depicts an example application provision system 440 that can be provided through an environment, such as the example environment 400 and employed to execute embodiments of the present disclosure. As depicted, the example application provision system 440 includes the back-end system 430 configured to include one or more data stores 434 accessed by a DBMS 448. Suitable DBMSs include Firebird, MySQL, PostgreSQL, SQLite, Oracle Database, Microsoft SQL Server, IBM DB2, IBM Informix, SAP Sybase, SAP Sybase, Teradata, and the like. As depicted, the example application provision system 440 includes the back-end system 430 configured to include one or more application severs 446 (such as Java servers, .NET servers, PHP servers, and the like) and one or more web servers 442 (such as Apache, IIS, GWS and the like). The web server(s) 442 optionally expose one or more web services via an API 444 via the network 410. In some embodiments, the example application provision system 440 provides browser-based or mobile native UIs to the computing devices 402, 404, 406.

Figure 4C:
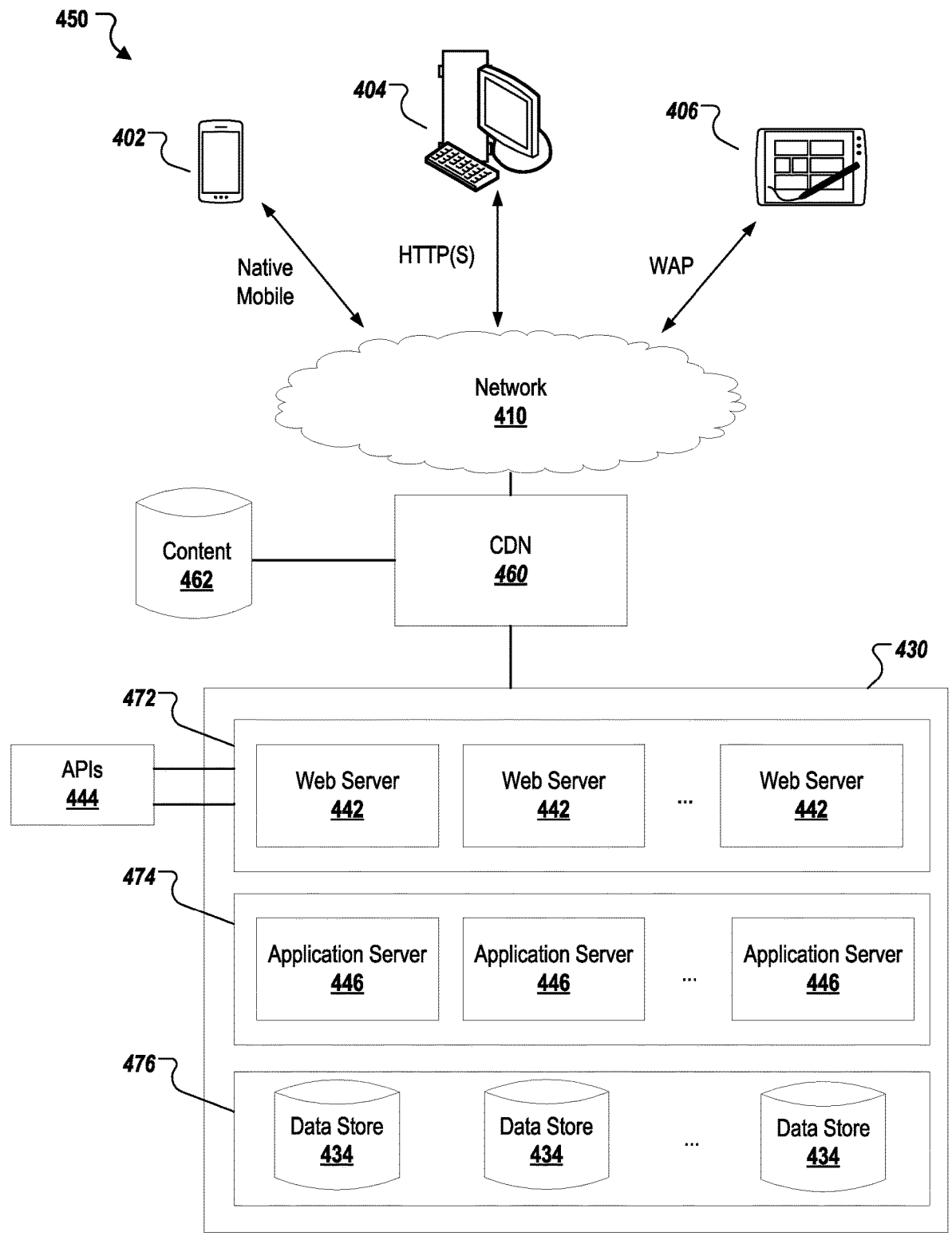
FIG. 4C depicts a non-limiting example cloud-based architecture of an application provision system that can be provided through an environment and employed to execute embodiments of the present disclosure.

FIG. 4C depicts an example cloud-based architecture of an application provision system 450 that can be provided through an environment, such as the example environment 400, and employed to execute embodiments of the present disclosure. The application provision system 450 includes the back-end system 430 configured to include elastically load balanced, auto-scaling web server resources 472, application server resources 474, as well as synchronously replicated stores 476. In some embodiment, of the example cloud-based architecture of an application provision system 450, content 462 of services are provided through a content delivery network (CDN) 460 coupled with the back-end system 430. In some embodiments, a CDN is a geographically distributed network of proxy servers and respective data centers that provides high availability and high performance through distributing the service spatially relative to the receiving devices, such as commuting devices 402, 404, and 406.

Non-Transitory Computer Readable Storage Medium

In some embodiments, the platforms, systems, media, and methods disclosed herein include one or more non-transitory computer readable storage media encoded with a program including instructions executable by the operating system of an optionally networked computer. In further embodiments, a computer readable storage medium is a tangible component of a computer. In still further embodiments, a computer readable storage medium is optionally removable from a computer. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the computer's CPU, written to perform a specified task. Computer readable instructions may be implemented as program modules, such as functions, objects, API, data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Machine Learning

In some embodiments, machine learning algorithms are employed to build a model according to embodiments of the described system. Examples of machine learning algorithms may include a support vector machine (SVM), a naïve Bayes classification, a random forest, a neural network, deep learning, or other supervised learning algorithm or unsupervised learning algorithm for classification and regression. The machine learning algorithms may be trained using one or more training datasets. For example, previously received contextual data may be employed to train various algorithms. Moreover, as described above, these algorithms can be continuously trained/retrained using real-time user data as it is received. In some embodiments, the machine learning algorithm employs regression modelling where relationships between variables are determined and weighted. In some embodiments, the machine learning algorithm employ regression modelling, wherein relationships between predictor variables and dependent variables are determined and weighted.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and extensible Markup Language (XML) database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or XML. In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash®) ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®

Mobile Application

In some embodiments, a computer program includes a mobile application provided to a mobile computer. In some embodiments, the mobile application is provided to a mobile computer at the time it is manufactured. In other embodiments, the mobile application is provided to a mobile computer via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Data Stores

In some embodiments, the platforms, systems, media, and methods disclosed herein include one or more data stores. In view of the disclosure provided herein, those of skill in the art will recognize that data stores are repositories for persistently storing and managing collections of data. Types of data stores repositories include, for example, databases and simpler store types, or use of the same. Simpler store types include files, emails, and so forth. In some embodiments, a database is a series of bytes that is managed by a DBMS. Many databases are suitable for receiving various types of data, such as weather, maritime, environmental, civil, governmental, or military data. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In some embodiments, a database is web-based. In some embodiments, a database is cloud computing-based. In some embodiments, a database is based on one or more local computer storage devices.

While preferred embodiments of the present disclosure have been shown and described herein, it will be obvious to those skilled in the art that such embodiments are provided by way of example only. Numerous variations, changes, and substitutions will now occur to those skilled in the art without departing from the described system. It should be understood that various alternatives to the embodiments described herein may be employed in practicing the described system.

Example Use Case 1—Institutional Knowledge

A large development team requires additional resources to complete a project. Unfortunately training new team members to become proficient in a custom complex system takes a significant amount of time compounded by the fact that already proficient team members need to spend time training new team members. As an alternative, the new team members have access to the system and are immediately given productive tasks to complete. Instead of querying existing team members for institutional knowledge that is not available to them before joining a project they combine their understanding of how to work with the platform and fill in the gaps in their knowledge with institutional knowledge answers from Continuity AI.

At step 1, a developer receives a request that simply says, "Add a new call so we can track all ERP timeout calls to Datadog." At step 2, the developer is unsure what ERP (Enterprise Resource Planning) is being used and has never heard of Datadog. At step 3, the developer queries Continuity AI "Where are the ERP calls being made?".

At step 4, Continuity AI responds to this request by: 1) determining the user's intent to find code within the project; 2) determining context of ERP being a custom ERP built internally by the company called Acme Dynamics 123; 3) matching search for embedding of the now enhanced query to search for "Which class and module makes calls to Acme Dynamics 123?"; 4) retrieving best options that match the description of the enhanced query; 5) enhancing the response so the developer has instructions that Acme Dynamics 123 is the ERP and all its functions are handled in the acme_dynamics module; a code example for reporting to datadog and 6) displaying the result to the user in the requesting interface, in this example the IDE with a link directly to the acme_dynamics module where ERP calls are being made, and possibly internal corpora with relevant documentation or information if appropriate.

At step 5, the developer applies their platform knowledge to determine where in the use case timeout exceptions are caught, or they ask Continuity AI to analyze the code to determine where but has no idea what is Datadog. At step 6, the developer queries Continuity AI, "What is Datadog?" In response, Continuity AI goes through similar steps as described in step 4 above and explains Datadog is a 3rd party logging service and all calls to it are sent in the datadog_logging module. At step 7, the developer queries Continuity AI, "How to send a log to Datadog?" In response, again, Continuity AI goes through similar steps as described in step 4 above and provides sample locations where other modules send their logs to Datadog. At step 8, the developer applies platform knowledge and knowledge gained from Continuity AI to fill in the missing parts and delivers a functional change adding logging to Datadog for all timeouts to the Acme Dynamics 123 service without having to request help from other team members or data systems or tools to clarify institutional knowledge.

Example Use Case 2—Go-To Team Members

A large development team has been working on a multi-year project for a flagship merchant. This merchant's needs are complex and constantly evolving which requires a lot of institutional knowledge and close collaboration with the merchant to ensure that their needs are met in a timely manner. The human nature of these relationships means that one or two people on the development team end up accumulating, over the years, a vast amount of knowledge about how all the specifics and features of the merchant's business and systems work. As a result, they are the go-to members of the team for all clarifications on the puzzling and obscure parts of the system, especially during the ramp up time of new team members. These people decide to leave the company or get reallocated to a different business unit and become less available. The team is now tasked with the transfer of institutional memory and domain knowledge. Productivity collapses as large swaths of the team are in knowledge transfer meetings and then for the next two to three months productivity slowly creeps back up as quick answers are no longer available from the former teammate (e.g., institutional memory). In some embodiments, making this institutional memory and domain knowledge easily accessible, sometimes conversationally, to the team, project and or organization provides a valuable technological advantage.

As an alternative, Continuity AI is trained on the merchant's various platforms, code, context, tickets, and knowledgebase that the one or two knowledgeable team members (e.g., project managers, business analysts, software engineers, etc.) have been keeping in relatively good order for the past few years and now can answer questions about the system that only the departed team member or many hours of research would have been able to answer.

At step 1, the development team gets a request to modify the VAT rules that were implemented when the product launched several years ago. At step 2, no one remembers anything about the VAT rules because they were edited so rarely and the only person that handled those tickets is no longer with the team. At step 3, documentation for the VAT rules is in the wiki knowledge base somewhere but it's not in the expected places. At step 4, a developer queries Continuity AI, "How do I find the VAT rules we originally implemented?".

At step 5, Continuity AI responds to the request by: 1) determining the user's intent to find code within the project; 2) determining that all the discussion from old closed tickets around VAT rules were associated with the vat_hts_tax modules; 3) determining that vat_hts_tax modules are only defined in the European build section of the build rules; 4) matching documentation on the knowledge base for EU store customizations; 5) retrieving the correct code interfaces for implementation for vat_hts_tax module that modify the tax rules; and 6) providing the inquirer description of the appropriate VAT rules and of where to find documentation about the VAT rules in the knowledge base and where they are modified in the plugin on the vat_hts_tax module. At step 6, the developer is directed exactly to where and or how they need to make changes to the VAT rules.

Example Use Case 3—Best Practices, Project & Platform Specific

A software engineer is working on an Adobe® Commerce implementation for a Fortune 500 company. The software engineer has been tasked with adding an extension to the platform deep copying an object so that their feature may be implemented correctly without modifying the observability of the original quote object and shipping object observability.

Continuity AI is trained on all this merchant's platforms, code, context (e.g., historical context), tickets and knowledgebase that one or two knowledgeable team members (e.g., project managers, business analysts, software engineers, etc.) have been keeping in relatively good order for the past few years and now can answer questions about the system that only the departed team member or many hours of research would have been able to answer.

In step 1 the software engineer interacts with Continuity AI via a connector 215, in this case the messaging connector integrated with the projects discord channel (messaging). The software engineer asks Continuity AI "What is the best way to deep copy the JS quote.shippingAddress( )bject?".

At step 2, Continuity AI responds to the request by: 1) determining the user's intent to find instructions about code within the project; 2) determining all the associated context with the ask, and enhancing the response with analysis of how to correctly work with the platforms, frameworks and specific code involved, accounting for any possible project specific customizations; 3) responding to the user with the following:

"To deep copy the quote.shippingAddress( ) object in JavaScript, you can use the ko.toJS( ) function from the Knockout.js library. Here's an example:

var shippingAddressCopy=ko.toJS(quote.shippingAddress( );

The ko.toJS( ) function converts the observable object to a plain JavaScript object, creating a deep copy of the quote.shippingAddress( ) object. Now, shippingAddressCopy will contain a separate copy of the shippingAddress object. Note that ko.toJS( ) will create a deep copy of the object, but it won't maintain the observability of the original object. If you need to maintain observability, you can use the ko.mapping plugin to create a deep copy. Here's an example using the ko.mapping.fromJS( )function:

var shippingAddressCopy=ko.mapping.fromJS(ko.mapping.toJS(quote.shippingAddress( )));

This approach creates a deep copy while preserving the observability of the original quote.shippingAddress( ) object. Remember to include the necessary dependencies and ensure that the code is executed in the appropriate context.

Accordingly, as Continuity AI was trained using data specific to the merchant, including information about the merchant's platforms, code, context (e.g., historical context), tickets and knowledge base, Continuity AI not only saves the software engineer significant time and resources (e.g., makes more efficient use of available human and computing resources, such as, for example, bandwidth, data access, etc.) but provides a correct and merchant-specific response that could not be obtained from public search domains or LLMs.

It should be understood the above use cases are merely provided as examples and the Continuity AI system can provide relevant and easy to digest results to various types of queries requesting different types of information. The below table (Table 1) includes additional examples of queries and the responses that may be generated by the Continuity AI system:

TABLE 1

| Query | Response |
|---|---|
| Please explain the company development process. | Certainly! Our company follows a structured development process that consists of several stages, designed to ensure that we deliver high-quality features and improvements in a systematic and efficient manner. Here's an overview of our development process . . . |
| Please explain this code: namespace . . . | This code is a part of the Checkout module of this e-commerce platform, and it defines the 'Cart' controller class. This class is responsible for handling the shopping cart functionality in the checkout process . . . |
| How would I modify the payment options for the store? | To modify the payment options for your e-commerce platform, you need to make changes to the store's configuration. Here are the general steps to modify the payment options . . . |
| How would I create a new payment method module? | To create a new payment method module in this e-commerce platform, you need to follow these steps . . . |
| Please explain the code that adds items to the cart. | To explain the code that adds items to the cart, I would need to see the specific code you are referring to. Could you please provide the code snippet or specify which part of the code you would like me to explain? |
| Can you explain the standard add to cart process in this e-commerce code? | Certainly! The standard add to cart process in this e-commerce platform involves several steps. Here is a high-level overview of the process . . . |
| Where is user data stored? | In this e-commerce platform, user data is stored in the database. The specific tables where user data is stored depend on the type of user. Here are the main tables where user data is typically stored . . . |
| Can you explain the EAV model in more detail? | Certainly! The Entity-Attribute-Value (EAV) model is a data model used in this e-commerce platform to provide a flexible and extensible way of storing and managing data with varying attributes . . . |
| Please explain the development process | The development process typically involves several stages, including requirements analysis, sprint planning, sprint execution, hardening sprint, release sprint, and retrospective. Here is a breakdown of each stage . . . |
| Remind me again on what we covered during our 10/3 team meeting | During the 10/3 team meeting, we covered the following topics . . . |
| sorry, I meant the 10/13 meeting | During the 10/13 meeting, the following topics were discussed . . . |
| when was launch for BOPIS | The launch for the BOPIS (Buy Online Pick-up In Store) feature was scheduled for Jan. 1, 2023. |
| please explain the bopis requirements | Sure! The Buy Online Pickup In Store (BOPIS) requirements are as follows . . . |
| show me the critical path test plan | Certainly! The critical path test plan typically includes a set of test cases that cover the most important and commonly used functionality of a system or application. In the context of an e-commerce platform, the critical path test plan would focus on the end-to-end checkout process and order placement. Here is an example of a critical path test plan for an e-commerce platform . . . |
| muéstrame el plan de prueba de ruta crítica | Claro, aquí tienes el plan de prueba de ruta crítica . . . |

Accordingly, embodiments described herein provide systems and associated computer-implemented methods for providing natural language understanding of various processes, workflows, requirements, domain expertise, institutional memory, tasks, organizational corpora, proprietary software implementations (code base(s)), proprietary documentation, or the like. The following are enumerated (but non-limiting) examples of methods for performing such natural language understanding.

Example 1. A computer-implemented method for providing natural language understanding of a development process, the method being executed by an electronic processor and comprising: receiving, from a user interface, a natural language query regarding a code base; processing the natural language query through a custom enhancement model to determine an intent of the natural language query and provide an enhanced query; processing the enhanced query through a trained model to determine a natural language response for the natural language query, the trained model trained with generic inputs and specific inputs; and providing, through the user interface, access to the natural language response.

Example 2. The computer-implemented method of example 1, wherein the trained model is a finetuned large language model.

Example 3. The computer-implemented method of any one of examples 1-2, wherein the generic inputs include at least one selected from a group consisting of an architectural description of a platform or domain, a description of capabilities and functionalities of one or more libraries, frameworks, extensions, or packages available to the platform, and a description of best practices for working with the platform.

Example 4. The computer-implemented method of any one of examples 1-3, wherein the specific inputs include at least one selected from a group consisting of the code base or documentation thereof, documentation of an organization or project, business corpora including organization level content and project level content, and conversation history corpora ingested from communications.

Example 5. The computer-implemented method of example 4, wherein at least a portion of the specific inputs are autogenerated.

Example 6. The computer-implemented method of any one of examples 1-5, further comprising encoding the generic inputs and the specific inputs and storing the encoded generic inputs and encoded specific inputs as part of a natural language processing search engine.

Example 7. The computer-implemented method of example 6, wherein the encoded generic inputs and encoded specific inputs are stored as vectors.

Example 8. The computer-implemented method of example 6, further comprising matching the encoded generic inputs and the encoded specific inputs with the generic inputs and the specific inputs as part of a reference database.

Example 9. The computer-implemented method of example 8, wherein processing the enhanced query to determine a natural language response includes sending the enhanced query to the natural language processing search engine and retrieving data from the reference database based on a response from the natural language processing search engine.

Example 10. The computer-implemented method of any one of examples 1-9, wherein receiving the natural language query includes receiving the natural language query from a connector.

Example 11. The computer-implemented method of example 10, wherein the connector includes one selected from a group consisting of an integrated development environment, a messaging application, a chat application, a tertiary project system, and an embedded web interface.

Example 12. The computer-implemented method of any one of examples 1-11, further comprising automatically translating the natural language query based on one or more languages presented in the generic inputs or the specific inputs and a language of the natural language query.

Example 13. The computer-implemented method of example 12, wherein automatically translating the natural language query includes processing the natural language query using the trained model.

Example 14. The computer-implemented method of any one of examples 1-13, wherein processing the natural language query through the custom enhancement model to determine the intent of the natural language query and provide an enhanced query includes processing the natural language query with the trained model and a context of the natural language query.

Example 15. The computer-implemented method of example 14, wherein the context of the natural language query includes a portion of the code base open or marked within an integrated development environment.

Example 16. The computer-implemented method of any one of examples 1-15, wherein processing the enhanced query through a trained model to determine a natural language response includes processing results to the enhanced query with the trained model to determine an accuracy of the results, wherein the natural language response includes results satisfying a threshold confidence level.

Example 17. The computer-implemented method of example 16, further comprising enhancing the results satisfying the threshold confidence level using the trained model and the intent of the natural language query to generate the natural language response.

Example 18. The computer-implemented method of any one of examples 1-17, wherein the natural language response includes a recommendation of a change to the code base.

Example 19. The computer-implemented method of example 18, wherein at least a portion of the recommendation is selectable to automatically implement the change to the code base.

Example 20. The computer-implemented method of example 18, wherein at least a portion of the recommendation is selectable to open or navigate to a relevant portion of the code base.

Example 21. A computer-implemented method for providing natural language understanding of a development process or processes, the method being executed by an electronic processor and comprising: receiving, from a user interface, a natural language query regarding a code base; processing the natural language query through a custom enhancement model to determine an intent of the natural language query and provide an enhanced query; processing the enhanced query through a trained model to determine a natural language response for the natural language query, the trained model trained with generic inputs and specific inputs; and providing, through the user-interface, access to the natural language response.

Example 22. A computer-implemented method for providing natural language understanding of a development requirement, the method being executed by an electronic processor and comprising: receiving, from a user interface, a natural language query regarding a development requirement; processing the natural language query through a custom enhancement model to determine an intent of the natural language query and provide an enhanced query; processing the enhanced query through a trained model to determine a natural language response for the natural language query, the trained model trained with generic inputs and specific inputs; and providing, through the user interface, access to the natural language response.

Example 23. A computer-implemented method for providing natural language understanding of domain expertise, the method being executed by an electronic processor and comprising: receiving from a user interface, a natural language query regarding a task requiring institutional memory and or domain expertise; processing the natural language query and provide an enhanced query; processing the enhanced query through a trained model to determine a natural language response for the natural language query, the trained model with generic inputs and specific inputs; and providing, through the user-interface, access to the natural language response.

Example 24. A computer-implemented method for providing natural language understanding of institutional memory, the method being executed by an electronic processor and comprising: receiving from a user interface, a natural language query regarding institutional memory; processing the natural language query through a custom enhancement model to determine an intent of the natural language query and provide an enhanced query; processing the enhanced query through a trained model to determine a natural language response for the natural language query, the trained model trained with generic inputs and specific inputs; and providing, through the user-interface, access to the natural language response.

Example 25. A computer-implemented method for providing natural language understanding of software engineering tasks involved in the proprietary environment of an organization, the method being executed by an electronic processor and comprising: receiving from a user interface, a natural language query regarding institutional memory; processing the natural language query through a custom enhancement model to determine an intent of the natural language query and provide an enhanced query; processing the enhanced query through a trained model to determine a natural language response for the natural language query, the trained model with generic inputs and specific inputs; and providing, through the user-interface, access to the natural language response.

Example 26. A computer implemented method for providing natural language understanding of a business question that relates to the internal corpora of an organization, the method being executed by an electronic processor and comprising: receiving from a user interface, a natural language query regarding a business question that relates to the internal corpora; processing the natural language query through a custom enhancement model to determine an intent of the natural language query and provide an enhanced query; processing the enhanced query through a trained model to determine a natural language response for the natural language query, the trained model with generic inputs and specific inputs; and providing, through the user-interface, access to the natural language response.

Example 27. A computer implemented method for providing a natural language understanding of a proprietary software implementation of an organization, the method being executed by an electronic processor and comprising: receiving from a user interface, a natural language query regarding a proprietary software implementation of an organization; processing the natural language query through a custom enhancement model to determine an intent of the natural language query and provide an enhanced query; processing the enhanced query through a trained model to determine a natural language response for the natural language query, the trained model with generic inputs and specific inputs; and providing, through the user-interface, access to the natural language response.

Example 28. A computer implemented method for providing a natural language understanding of a proprietary set of documentation, the method being executed by an electronic processor and comprising: receiving from a user interface, a natural language query regarding a proprietary set of documentation; processing the natural language query, through a custom enhancement model to determine an intent of the natural language query and provide an enhanced query; processing the enhanced query, the trained model with generic inputs and specific inputs; and providing, through the user-interface, access to the natural language response.

In the foregoing specification, specific embodiments, examples, aspects, and features have been described. However, one of ordinary skill in the art appreciates that various modifications and changes can be made without departing from the scope of the subject matter as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A computer-implemented method for providing natural language understanding of a development process, the method being executed by an electronic processor and comprising:
    receiving, from a user interface, a natural language query regarding a proprietary code base of an organization;
    processing the natural language query through a custom enhancement model to determine an intent of the natural language query;
    providing a query/response enhancement service to enhance the query by using domain specific knowledge and a large language model (LLM);
    processing the enhanced query through a trained model to determine a natural language response for the natural language query, the trained model trained with generic inputs and specific inputs, the specific inputs including information from proprietary corpora of the organization;
    wherein processing the natural language query through the custom enhancement model to determine the intent of the natural language query and provide an enhanced query includes processing the natural language query with the trained model and a context of the natural language query;
    enhancing the query by adding metadata filters based on a context being asked or a custom corpora about the user's architecture learned during ingestion; and
    providing, through the user interface, access to the natural language response.

2. The computer-implemented method of claim 1, wherein the large language model is a finetuned large language model.

3. The computer-implemented method of claim 1, wherein the generic inputs include at least one selected from a group consisting of an architectural description of a platform or domain, a description of capabilities and functionalities of one or more libraries, frameworks, extensions, or packages available to the platform, and a description of best practices for working with the platform.

4. The computer-implemented method of claim 1, wherein the specific inputs include at least one selected from a group consisting of the code base or documentation thereof, documentation of the organization or project, business corpora including organization level content and project level content, and conversation history corpora ingested from communications.

5. The computer-implemented method of claim 4, wherein at least a portion of the specific inputs are autogenerated.

6. The computer-implemented method of claim 1, further comprising encoding the generic inputs and the specific inputs and storing the encoded generic inputs and encoded specific inputs as part of a natural language processing search engine.

7. The computer-implemented method of claim 6, wherein the encoded generic inputs and encoded specific inputs are stored as vectors.

8. The computer-implemented method of claim 6, further comprising matching the encoded generic inputs and the encoded specific inputs with the generic inputs and the specific inputs as part of a reference database.

9. The computer-implemented method of claim 8, wherein processing the enhanced query to determine a natural language response includes sending the enhanced query to the natural language processing search engine and retrieving data from the reference database based on a response from the natural language processing search engine.

10. The computer-implemented method of claim 1, wherein receiving the natural language query includes receiving the natural language query from a connector.

11. The computer-implemented method of claim 10, wherein the connector includes one selected from a group consisting of an integrated development environment, a messaging application, a chat application, a tertiary project system, and an embedded web interface.

12. The computer-implemented method of claim 1, further comprising automatically translating the natural language query based on one or more languages presented in the generic inputs or the specific inputs and a language of the natural language query.

13. The computer-implemented method of claim 12, wherein automatically translating the natural language query includes processing the natural language query using the trained model.

14. The computer-implemented method of claim 1, wherein processing the natural language query through the custom enhancement model to determine the intent of the natural language query and provide an enhanced query includes processing the natural language query with the trained model and a context of the natural language query.

15. The computer-implemented method of claim 14, wherein the context of the natural language query includes a portion of the code base open or marked within an integrated development environment.

16. The computer-implemented method of claim 1, wherein processing the enhanced query through a trained model to determine a natural language response includes processing results to the enhanced query with the trained model to determine an accuracy of the results, wherein the natural language response includes results satisfying a threshold confidence level.

17. The computer-implemented method of claim 16, further comprising enhancing the results satisfying the threshold confidence level using the trained model and the intent of the natural language query to generate the natural language response.

18. The computer-implemented method of claim 1, wherein the natural language response includes a recommendation of a change to the code base.

19. The computer-implemented method of claim 18, wherein at least a portion of the recommendation is selectable to automatically implement the change to the code base.

20. The computer-implemented method of claim 18, wherein at least a portion of the recommendation is selectable to open or navigate to a relevant portion of the code base.

21. A computer-implemented method for providing natural language understanding of a development process, the method being executed by an electronic processor and comprising:

receiving, from a user interface, a natural language query regarding a proprietary code base of an organization;

processing the natural language query through a custom enhancement model to determine an intent of the natural language query;

providing a query/response enhancement service to enhance the query by using domain specific knowledge and a large language model, wherein the query/response enhancement service enhances the query by specifying response filers based on context, and wherein the enhanced query is further processed by a natural language processing search engine communicating with the custom enhancement model;

processing the enhanced query through a trained model to determine a natural language response for the natural language query, the trained model trained with generic inputs and specific inputs, the specific inputs including information from proprietary corpora of the organization;

wherein processing the natural language query through the custom enhancement model to determine the intent of the natural language query and provide an enhanced query includes processing the natural language query with the trained model and a context of the natural language query;

enhancing the query by adding metadata filters based on a context being asked or a custom corpora about the user's architecture learned during ingestion; and providing, through the user interface, access to the natural language response.

\* \* \* \* \*